United States Patent [19]
Hsu et al.

[11] Patent Number: 5,765,021
[45] Date of Patent: Jun. 9, 1998

[54] COMPUTER SYSTEM HAVING SECOND PROGRAM FOR TRANSFERRING DATA BETWEEN SECOND PORT CONNECTED TO A FIRST PORT AND THE SOFTWARE PORTION OF A MODEM

[75] Inventors: Tseng Jan Hsu, Pleasanton; Wen-Liang Hsu, Milpitas, both of Calif.

[73] Assignee: PC-TEL, Inc., Milpitas, Calif.

[21] Appl. No.: 622,780

[22] Filed: Mar. 27, 1996

[51] Int. Cl.$^6$ .................................................. G06F 15/40
[52] U.S. Cl. ............................................................ 395/828
[58] Field of Search .................................. 395/500, 280, 395/281, 282, 821, 822, 823, 824, 825, 828, 830; 375/222; 379/93.31, 93.28

[56] References Cited

U.S. PATENT DOCUMENTS

| | | | |
|---|---|---|---|
| 4,817,147 | 3/1989 | Gorniak et al. | 380/49 |
| 5,170,470 | 12/1992 | Pindar et al. | 395/828 |
| 5,408,614 | 4/1995 | Thornton et al. | 395/841 |
| 5,450,530 | 9/1995 | Snyder et al. | 375/220 |
| 5,477,415 | 12/1995 | Mitcham et al. | 361/686 |
| 5,604,870 | 2/1997 | Moss et al. | 395/280 |
| 5,644,593 | 7/1997 | Bailey et al. | 375/222 |

*Primary Examiner*—Moustafa M. Meky
*Attorney, Agent, or Firm*—Skjerven, Morrill, MacPherson, Franklin & Friel; Alan H. MacPherson; David T. Millers

[57] ABSTRACT

Connecting a null modem cable between first and second communications ports of a host computer and executing a background routing program which transfers information between the second communications ports and a host signal processor (HSP) modem enables a DOS application which is configured to directly access a hardware UART of the first communication port to communicate with the HSP modem even if the HSP lacks a hardware UART. In one embodiment, the DOS application runs in a DOS virtual machine in a Windows™ operating system, and the routing application runs in a system virtual machine. The HSP modem includes a software portion inside a port driver in the operating system kernel. The routing program is started before the DOS application, executed in the background of the DOS application, and removed after completion of the DOS application.

16 Claims, 1 Drawing Sheet

COMPUTER SYSTEM HAVING SECOND PROGRAM FOR TRANSFERRING DATA BETWEEN SECOND PORT CONNECTED TO A FIRST PORT AND THE SOFTWARE PORTION OF A MODEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to computer systems containing host signal processor modems and methods for using a modem having a non-standard hardware interface with an application designed to directly access a standard hardware interface.

2. Description of Related Art

Most standard modems contain hardware which performs functions such as data compression, error code generation, constellation mapping, quadrature amplitude modulation, demodulation, demapping, error checking, and decompression which may be required when implementing a communication protocol for transferring data over a telephone line. A host computer connected to a standard modem is typically unconcerned with the communication protocol implemented by the modem, and communications between the host computer and a modem is primarily the data being transferred over the telephone line. In common IBM PC compatible architectures, a hardware interface known as a universal asynchronous receiver transmitter (UART) is standard for host to modem communications.

In host signal processor (HSP) modems, a host computer executes software which preforms many of the functions performed by hardware in standard modems. For example, a hardware portion of an HSP modem may primarily be a codec and an interface circuit. The codec converts an analog signal received on a telephone line to digital samples and converts digital samples from the host computer to an analog signal which can be transmitted on a telephone line. The digital samples are transferred between the hardware portion of the HSP modem and the host computer via the interface circuit. The host computer executes a software portion of the HSP modem to perform the functions required to convert received digital samples into digital data and convert digital data into digital samples representing an analog signal to be transmitted.

U.S. patent application Ser. No. 08/428,935 entitled "Communications Interface and Conflict Avoidance Using a Software Simulation of A UART", still pending ,and U.S. patent application Ser. No. 08/527,668, entitled "Host Signal Processing Communication System that Compensates for Missed Execution of Signal Maintenance Procedures", still pending, described HSP communication systems having non-standard hardware interfaces (not a UART) and are incorporated by reference herein in their entirety. As describe in the incorporated patents, a software UART for the HSP modem can be incorporated into a special communications driver that replaces or supplements a communications driver in an operating system such as IBM OS/2™ or Microsoft Windows™ 95 or NT. The software UART intercepts or provides data to communications applications designed to communicate via a communications driver in the operating system. However, some applications such as some applications designed to run in a DOS environment directly access hardware UARTs without using a communications driver that is easily adapted for an HSP modem. Until now such applications could not use an HSP modem.

SUMMARY OF THE INVENTION

In accordance with the invention, an application which is designed to directly access a modem having a standard hardware interface such as a universal asynchronous receiver transmitter (UART) can use a host signal processor (HSP) modem having a non-standard hardware interface, i.e. lacking a hardware UART. The application is configured to access a built-in hardware UART in a first communications port such as port COM 1 or COM 2 of an IBM PC compatible computer. A null modem cable connects the first communications port to a second communication port such as port COM 2 or COM 1. The HSP modem which has a non-standard hardware interface and a software UART is assigned to a third communication port such as port COM 3 or COM 4 of the host computer, and a routing program executed concurrently with the application automatically transfers information between the second communication port and the software portion of the HSP modem. Accordingly, communications between the application and the HSP modem is conducted via the fist communications port, the null modem cable, the second communications port, and the routing program.

In one embodiment of the invention, the application is a DOS application which running on a DOS virtual machine in operating system such as a Windows™ 95 or NT. The routing program executes in a system virtual machine and uses resources such as drivers in an operating system kernel. The kernel includes a driver for the third communications port which for example implements a software UART and a software portion of the HSP modem. The routing programs is a Windows-based application that is started before the DOS application and is configured to transfer information from one port which is coupled to the null modem to the HSP modem. After the DOS application is closed, the routing program can be closed to make the HSP modem available for use by other Windows-based applications; and the null modem can be removed, to make the comports available for other uses.

DETAILED DESCRIPTION OF THE PREFERRED EMBODIMENT

Figure 1:
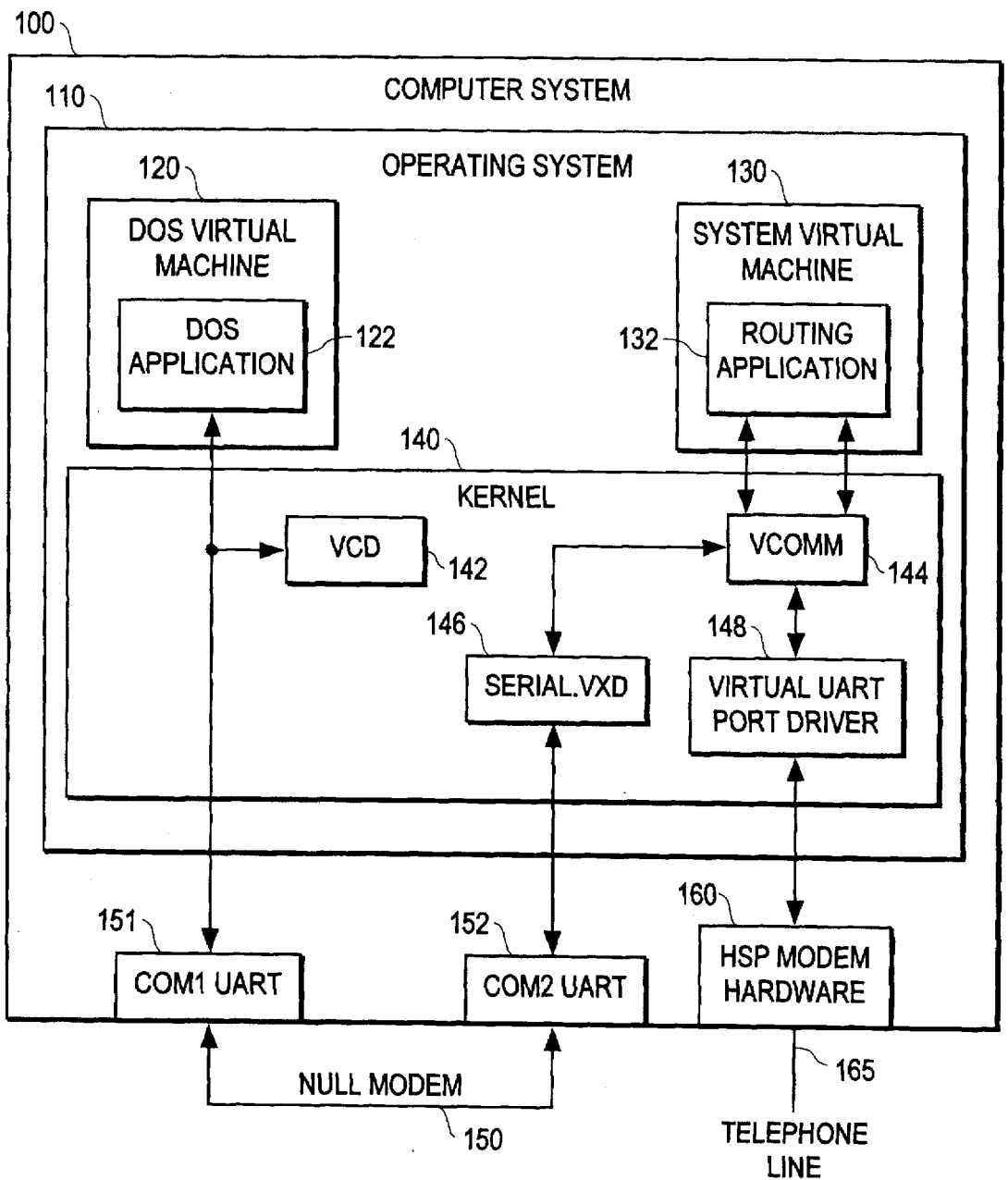
Fig. 1 shows a block diagram of logical and physical elements of a computer system in accordance with an embodiment of the invention.

In accordance with an embodiment of the invention, a computer system uses a null modem cable to route data from an application through one standard communications port of a host computer, through the null modem, to a second standard communications port of the host computer. A routing program running in the background of the application transfers data from the second communications port to a host signal processor (HSP) modem. Execution of the routing program is transparent to the application which treats the first communications port as a modem having a standard interface. According to an aspect of the invention, existing software which was never designed to work with an HSP modem can use an HSP modem.

FIG. 1 shows a block diagram of logical and physical elements of a computer system 100 in accordance with an embodiment of the invention. System 100 includes an IBM PC or compatible computer which has communications ports 151 and 152 and an HSP modem. Communications ports 151 and 152 are serial ports and in one embodiment are the serial ports commonly referred to as COM 1 and COM 2. Each communication port 151 and 152 includes a hardware universal asynchronous receiver transmitter (UART). A hardware portion 160 of the HSP modem has an interface circuit connected to a computer bus such as an ISA, PCI, USE, or PCMCIA bus of the host computer and is assigned bus addresses corresponding to an I/O port such as COM 3 or COM 4. As in communication systems described in the above incorporated patent applications, hardware portion 160 has a non-standard hardware interface.

During operation of computer system 100, a host processor executes the routines necessary to implement an operating system 110 such as OS/2™ or Windows™ 95 or NT under which applications are executed. Operating system 110 can construct one or more virtual machines which provide different operating environments for applications requiring different system resources. For example, a windows-based routing application 132 is executable in a system virtual machine 130 and has access to system resources such a communications port controller (VCOMM) 144 and port drivers 146 and 148 in a kernel 140.

A DOS application 122 which requires the system resources available in a computer running the MS-DOS operating system is executed in a DOS virtual machine 120 but is not designed to uses windows system resources such as port driver 148. DOS application 122 may be a communication program or game or any type of program which uses a modem. To communicate with a modem, DOS application 122 directly accesses addresses presumably assigned to a hardware UART for the modem. To use the HSP modem, DOS application 122 is configured as if a modem is assigned to port COM 1, and instead of communicating with a UART in a modem, DOS application 122 communicates with the UART in communications port 151. Information is routed between communications port 151 and the HSP modem through a null modem cable 150, communications port 152, kernel 140, and routing application 132 as described below.

DOS application 122 directly accesses addresses corresponding to communications port 151 to transfer information. However, a kernel resource 142 may intercept or monitor the communications between DOS application 122 and communications port 151 to avoid contention in multitasking operating systems where multiple DOS virtual machines are running simultaneously. For example, the Windows™ 95 operating system contains a system resource VCD which assigns a communications port to a DOS virtual machine and stops multiple DOS applications from accessing the same communications port.

Null modem cable 150 carries information between communications port 151 and communications port 152. Such cables are well known in the art and connect transmit and receive pins of communications port 151 respectively to receive and transmit pins of communications port 152. Null modem cable 150 makes communications ports 151 and 152 unavailable for other purposes; and if one of communications port 151 or 152 is COM 1, any pointing device such as a mouse must have an alternative connection if the pointing device is to be used with DOS application 122.

Routines in kernel 140 execute at the highest privilege level (ring 0) and can access communications port 152 to retrieve information from DOS application 122 or transmit information to DOS application 122. Windows-based routing application 132 runs in system virtual machine 130 at a low privilege level (ring 3) and uses communications port controller 144 and port drivers 146 and 148 in kernel 140 to access communications port 152 and the communications port assigned to the HSP modem. In operating system 110, port driver 146 is a standard a serial port driver such as SERIAL. VxD provided by the Windows™ 95 operating system. Port driver 148 is a custom driver program which contains at least a part of the software portion of the HSP modem. After being configured, routing application 132 runs in the background of DOS application 122 and actively transfers data between communications port 152 and HSP modem hardware 160 via communication port controller 144, serial port driver 146, and port driver 148. A program listing of a routing program which implements the functions of routing application 132 is provided below in the Appendix.

To use DOS application 122 with the HSP modem, windows-based routing application 132 is started and configured to transfer all information from communications port 152 to the HSP modem and transfer all information from the HSP modem to communications port 152. DOS application 122 is then started and is configured to communicate with a modem expected to be at communications port 151. Routing application 132 continues to run in system virtual machine 130 and in the background of DOS application 122. DOS application 122 can then read and write to the hardware UART in communication port 151 which provides an indirect connection via null modem 150, kernel 140, and routing application 132 to the hardware portion 160 of the HSP modem. After execution of DOS application 122 is complete and DOS application 122 is closed, routing application 132 is closed so that other applications can use port driver 148 and the HSP modem.

Although the present invention has been described with reference to a particular embodiment, the description is only an example of the invention's application and should not be taken as a limitation. Various adaptations and combinations of features of the embodiments disclosed are within the scope of the invention as defined by the following claims.

APPENDIX

The following is a C language listing of a windows application, "router.c", which routes data between com port 2 and com port 4 in an IBM compatible personal computer. The program can be compiled using most C compilers including Microsoft C compiler, version 2.0, which is commercially available from Microsoft, Inc. The include files "windows.h" and "mmsystem.h" are standard files provided with the Microsoft C compiler.

```
/* (C) Copyright PC-TEL, Inc. router.c */
//
#include <windows.h>
#include <mmsystem.h>
#define   PTBUFF 1024
//
char Buff[PTBUFF];
int  CommActivate;
int  idCommDev4=0, idCommDev2=0;
int  cbInCom4, cbInCom2;
BYTE     Com4msr,Com2msr;
COMSTAT  ComStat4,ComStat2;
HWND     hwndmain;
char     szAppName[]="PCtel-Router";
long FAR PASCAL _export WndProc (HWND,UINT,UINT,LONG);
long FAR PASCAL _export SetComm ();
void HiddenTask( void );
/*****************************************************/
int PASCAL WinMain(HANDLE hInstance,
HANDLE hPrevInstance, LPSTR lpCmdLine, int nCmdShow)
{
HWND     hwnd;
WNDCLASS wc;
MSG      msg;
    if (!hPrevInstance) {
      wc.style = NULL;
      wc.lpfnWndProc = WndProc;
```

```
            wc.cbClsExtra = 0;
            wc.cbWndExtra = 0;
            wc.hInstance = hInstance;
            wc.hIcon = LoadIcon(NULL,IDI_APPLICATION);
 5          wc.hCursor = NULL;
            wc.hbrBackground = GetStockObject(WHITE_BRUSH);
            wc.lpszMenuName =   NULL;
            wc.lpszClassName = szAppName;
            RegisterClass(&wc);
10      }
        hwnd=CreateWindow (szAppName, szAppName,
                WS_OVERLAPPEDWINDOW,
                CW_USEDEFAULT,
                CW_USEDEFAULT,CW_USEDEFAULT,
15              CW_USEDEFAULT,NULL,NULL,hInstance,NULL);
        ShowWindow(hwnd, SW_SHOWMINNOACTIVE);
        UpdateWindow(hwnd);
        while (TRUE) {
            if (PeekMessage(&msg, NULL, 0, 0, PM_REMOVE)) {
20              if (msg.message == WM_QUIT)
                    break;
                TranslateMessage(&msg);
                DispatchMessage(&msg);
            }
25          HiddenTask();
        } //end while
        return (msg.wParam);
    }
    /*********************************************************
30  HiddenTask: keep data flow between COM2 <-> COM4 in the
    background
    *********************************************************/
    void HiddenTask()
    {
35      if (CommActivate == FALSE)
            return;
```

-10-

```
                /*data flow control between COM2/4 port*/
                GetCommError(idCommDev2,&ComStat2);
                if (ComStat2.cbInQue < (PTBUFF/4))
                     //if below queue threshold
5                    EscapeCommFunction(idCommDev2,SETRTS);
                else if (ComStat2.cbInQue > (PTBUFF/2))
                     //if queue full
                     EscapeCommFunction(idCommDev2,CLRRTS);
                GetCommError(idCommDev4,&ComStat4);
10              if (ComStat4.cbInQue < (PTBUFF/4))
                     //if below queue threshold
                     /*set RTS allow sending data*/
                     EscapeCommFunction(idCommDev4,SETRTS);
                else if (ComStat4.cbInQue > (PTBUFF/2))
15                   //if queue full
                     /*clear RTS to stop sending data*/
                     EscapeCommFunction(idCommDev4,CLRRTS);
                GetCommError(idCommDev4,&ComStat4);
                if (ComStat2.cbInQue)
20              {
                     if (ComStat4.cbOutQue < (PTBUFF/2))
                     //if queue is half clear
                     {
                /*direct data from COM2 to COM4*/
25              cbInCom2=ReadComm(idCommDev2,Buff,(PTBUFF/2));
                cbInCom2=WriteComm(idCommDev4,Buff,cbInCom2);
                     }
                }
                if (ComStat4.cbInQue)
30              {
                     if (ComStat2.cbOutQue < (PTBUFF/2))
                     //if queue at least 1/2 clear
                     {
                /*direct data from COM4 to COM2*/
35              cbInCom4=ReadComm(idCommDev4,Buff,(PTBUFF/2));
                cbInCom4=WriteComm(idCommDev2,Buff,cbInCom4);
```

```
                }
            }
        }
        /*****************************************************
 5      SetComm:Open COM2/4 for HiddenTask
        *****************************************************/
        long PASCAL _export SetComm()
        {
        DCB      dcb;
10      //Open COM2
        if((idCommDev2=OpenComm("COM2",2*PTBUFF,2*PTBUFF)) < 0)
                {
                    DestroyWindow(hwndmain);
                    return 0;
15              }
                if (BuildCommDCB("COM2:19200,n,8,1",&dcb) < 0)
                {
                    DestroyWindow(hwndmain);
                    return 0;
20              }
                dcb.BaudRate=0xFEFF;//115200 dte rate
                dcb.fOutxCtsFlow=1;
                if (SetCommState(&dcb) < 0)
                {
25                  DestroyWindow(hwndmain);
                    return 0;
                }
        //Open COM4
        if((idCommDev4=OpenComm("COM4",2*PTBUFF,2*PTBUFF)) < 0)
30              {
                    DestroyWindow(hwndmain);
                    return 0;
                }
                if (BuildCommDCB("COM4:19200,n,8,1",&dcb) < 0)
35              {
                    DestroyWindow(hwndmain);
```

-12-

```
                    return 0;
            }
            dcb.BaudRate=0xFEFF;//115200 dte rate
            dcb.fOutxCtsFlow=1;
 5          if (SetCommState(&dcb) < 0)
            {
                    DestroyWindow(hwndmain);
                    return 0;
            }
10          CommActivate=TRUE;
            Com2msr=0;
            Com4msr=0;
            return 0;
    }
15  /*****************************************************/
    long FAR PASCAL __export WndProc(HWND hWnd,
            UINT message, UINT wParam, LONG lParam)
    {
            hwndmain=hWnd;
20          switch (message)
            {
                case WM_CREATE:
                  CommActivate=FALSE;
                  SetComm();
25                    return 0;
                case WM_QUERYOPEN:
                      return 0;
                case WM_DESTROY:
                  CommActivate=FALSE;
30                CloseComm(idCommDev2);
                  CloseComm(idCommDev4);
                        PostQuitMessage(0);
                        return 0;
            }
35  return (DefWindowProc(hWnd, message, wParam, lParam));
    }
```

-13-

We claim:

1. A computer system comprising:
   a host computer having a first communications port and a second communications port;
   a null modem cable connected between the first communications port and the second communications port;
   a host signal processor modem having a hardware portion connected to the host computer and a software portion executed by the host computer;
   a first program running on the host computer, wherein the first program is configured to access the first communications port; and
   a second program running on the host computer, wherein the second program transfers data between the second communications port and the software portion of the host signal processor modem.

2. The computer system of claim 1, wherein each of the first and second communications ports comprises a universal asynchronous receiver transceiver.

3. The computer system of claim 2, wherein:
   the hardware portion of the host signal processor modem comprises a non-standard hardware interface for a third communications port of the host computer; and
   the software portion of the host signal processor modem comprises a software emulation of a universal asynchronous receiver transceiver.

4. The computer system of claim 1, further comprising a first port driver for a third communications port which is assigned to the host signal processor modem, the first port driver containing the software emulation, wherein the second program runs in a background of the first program and transfers information between the second communications port and the first port driver.

5. The computer system of claim 4, further comprising a second port driver for the second communications port, wherein the second program accesses the second communications port via the second port driver.

6. The computer system of claim 1, further comprising an operating system executed by the host computer, wherein:
   the operating system creates a first operating environment and a second operating environment;
   the first program runs in the first operating environment; and
   the second program runs in the second operating environment.

7. The computer system of claim 6, further comprising a first port driver for a third communications port which is assigned to the host signal processor modem, the first port driver containing the software emulation, wherein the second program runs in a background of the first program and transfers information between the second communications port and the first port driver.

8. The computer system of claim 7, wherein the first port driver is part of a kernel for the operating system and executes at a higher privilege level than the first and second programs.

9. The computer system of claim 6, wherein the first operating environment is a virtual machine for execution of DOS applications.

10. The computer system of claim 9, wherein the second operating environment is a virtual machine for execution of windows-based applications.

11. The computer system of claim 1, wherein the second program runs in a background of the first program.

12. A method for using a host signal processor modem, the method comprising:
    executing a first program which directly accesses a first communications port of a host computer to communicate with a modem;
    coupling the first communication port to a second communication port of the host computer to establish a data flow between the first program and the second communication port via the first communication port; and
    executing a second program in a background of the first program, wherein the second program accesses the second communications port and transfers data between the second communications port and the host signal processor modem.

13. The method of claim 12, wherein coupling the first and second communications ports comprises connecting a null modem cable between the first communications port and the second communications port.

14. The method of claim 12, wherein executing the first program comprises:
    generating information in a format for communications with a universal asynchronous receiver transmitter; and
    accessing an address assigned to the first communication port to transfer the information in the format for communications with a universal asynchronous receiver transmitter.

15. The method of claim 12, wherein:
    executing the first program comprises executing a DOS application in a DOS virtual machine; and
    executing the second program comprises executing a routing program in a Windows virtual machine.

16. The method of claim 12, wherein executing the second program comprises transferring data between the second communications port and a port driver in a kernel of an operating system, the port driver containing a software portion of the host signal processor modem.

* * * * *